Figure 1:
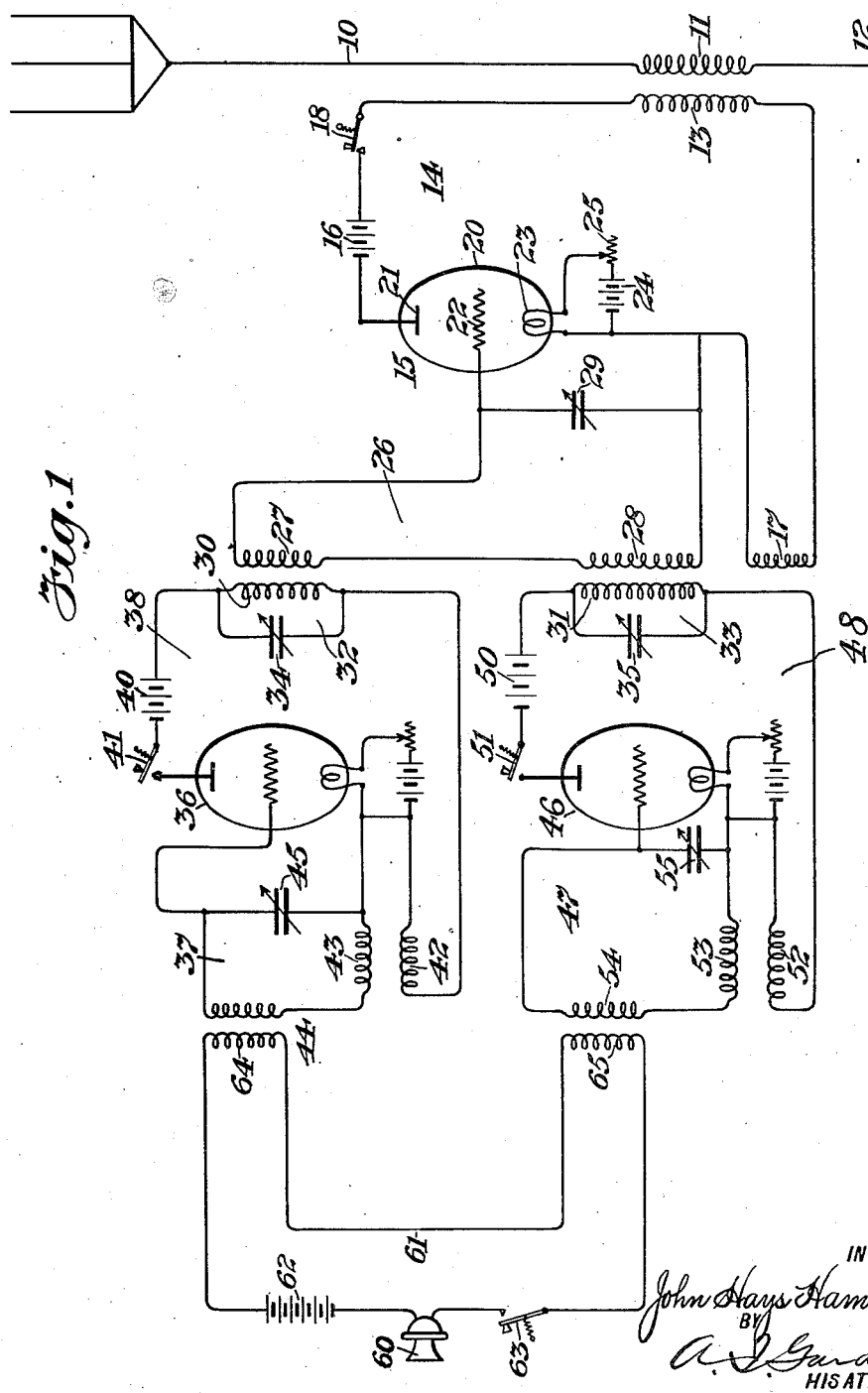

Oct. 30, 1923.

J. H. HAMMOND, JR 1,472,218

TRANSMISSION AND RECEIVING SYSTEM

Original Filed Aug. 5, 1919    2 Sheets-Sheet 1

INVENTOR
John Hays Hammond Jr.
BY
A. J. Gardner
HIS ATTORNEY

Oct. 30, 1923.
J. H. HAMMOND, JR
1,472,218
TRANSMISSION AND RECEIVING SYSTEM
Original Filed Aug. 5, 1919   2 Sheets-Sheet 2
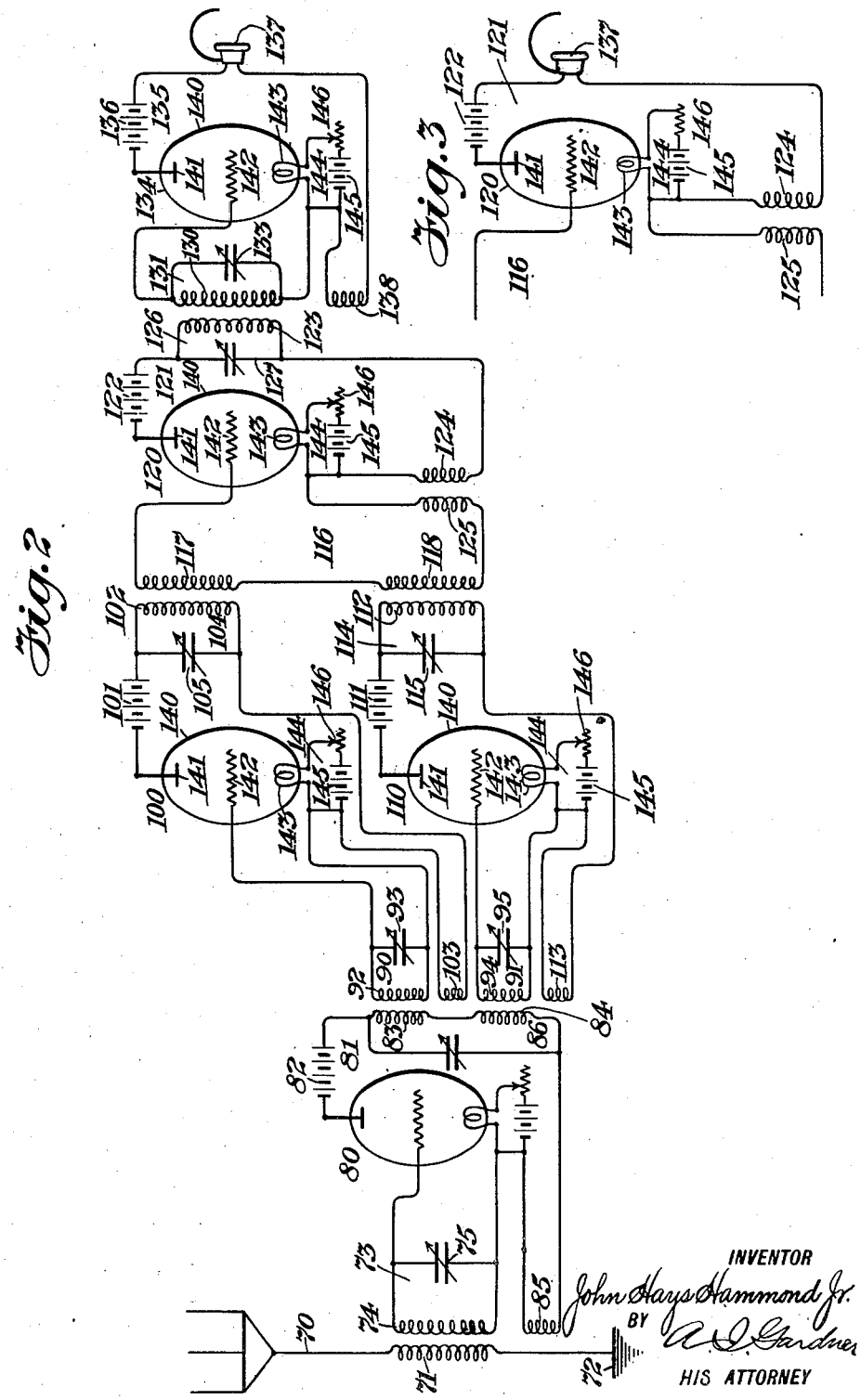
INVENTOR
John Hays Hammond Jr.
BY
A. J. Gardner
HIS ATTORNEY Patented Oct. 30, 1923.

1,472,218

UNITED STATES PATENT OFFICE.

JOHN HAYS HAMMOND, JR., OF GLOUCESTER, MASSACHUSETTS.

TRANSMISSION AND RECEIVING SYSTEM.

Application filed August 5, 1919, Serial No. 315,463. Renewed January 25, 1923.

*To all whom it may concern:*

Be it known that I, JOHN HAYS HAMMOND, Jr., a citizen of the United States, and a resident of Gloucester, in the county of Essex and State of Massachusetts, have invented certain new and useful Improvements in Transmission and Receiving Systems, of which the following is a specification.

Some of the objects of the present invention are to provide a method and apparatus for transmitting and receiving messages; to provide means for impressing upon a series of emitted waves a plurality of series of periodic modifications of different frequencies respectively and impressing on said waves and modifications a series of irregular modifications corresponding to a message; to provide means for selecting from a series of received waves a predetermined series of periodic modifications; to provide means for transmitting and receiving telephonic and telegraphic messages through the medium of irregular modifications impressed upon a plurality of series of periodic modifications of different frequencies respectively; and to provide other improvements as will hereinafter appear.

In the accompanying drawings, Fig. 1 represents diagrammatically one form of transmitting apparatus embodying the present invention; Fig. 2 represents diagrammatically one form of receiving apparatus embodying the present invention; and Fig. 3 represents a fragmentary portion of the receiving apparatus employed when the system of the invention is used in connection with telephony.

Referring to the drawings, one form of a transmitting apparatus is shown in Fig. 1 comprising an open aerial circuit 10, having a secondary inductance 11, grounded at 12, the said circuit 10 constituting the medium for transmitting the impressed radiant energy waves into space to be received by an apparatus to be hereinafter described.

For causing the aerial circuit 10, 11 and 12 to emit waves of radiant energy of a suitable high frequency, the secondary coil 11 of the aerial circuit 10 is inductively coupled to a primary coil 13 located in a closed circuit 14 controlled by an autodyne or thermionic oscillator 15. The circuit 14 includes a battery 16, a tickler coil 17 and for starting purposes a key 18. The oscillator 15 may be of any suitable construction but consists of an evacuated bulb 20 having enclosed therein a plate terminal 21, a grid 22 and a filament 23 arranged to be heated by a local circuit energized by a battery 24 adjusted by a rheostat 25. The oscillator 15 is arranged to be controlled by a closed circuit 26 including two secondary coils 27 and 28 and a variable condenser 29, the function of said circuit 26 being to react under the influence of the tickling coil 17 when the key 18 is closed. This reaction causes tube 15 to oscillate and acting through coils 13 and 11 causes the aerial circuit 10 to oscillate in a well known manner and emit radiant waves of a high frequency, say, 1,000,000 per second.

In order to impress upon the high frequency waves emitted by the aerial circuit 10, 11 and 12 periodic variations in amplitude the secondary coils 27 and 28 are inductively coupled respectively to two primary coils 30 and 31, the former being included in a closed oscillatory circuit 32 tuned to a frequency of, say, 50,000 per second and the latter being included in a closed oscillatory circuit 33 tuned to a frequency of, say, 35,000 per second. Variable condensers 34 and 35 are respectively included in the circuits 32 and 33 and the tuning of the circuits is adjusted accordingly as the system is used for telephony or telegraphy, if the former a frequency above audibility is employed, and if the latter a frequency within audibility is employed.

Oscillations of the desired secondary frequency of, say, 50,000 per second are produced in the circuit 32 by an autodyne or thermionic oscillator 36 arranged to be controlled by an oscillatory circuit 37 and controlling a circuit 38 including the oscillatory circuit 32. The circuit 38 also includes a battery 40, or other source of current, a control key 41, and a tickler coil 42 arranged in operative relation to a coil 43 in the oscillatory circuit 37. The circuit 37 also includes a secondary coil 44 and a variable condenser 45, all connected to control the oscillator 36 in a well known manner.

Oscillations of the desired secondary frequency of, say, 35,000 per second are produced in the circuit 33 by an autodyne or thermionic oscillator 46 arranged to be controlled by an oscillatory circuit 47 and controlling a circuit 48 including the oscillatory circuit 33. The circuit 48 also includes a battery 50, or other source of unidirectional current, a control key 51, and a tickler coil 52 arranged in operative relation to a coil in 53 in the oscillatory circuit 47. The circuit 47 also includes a secondary coil 54 and a variable condenser 55 all connected to control the oscillator 46 in a well known manner.

For impressing upon the periodically modified radiant waves emitted by the aerial circuit amplitude variations corresponding to sound waves to form a telephonic message, a telephone transmitter 60 is arranged in a circuit 61 including a battery 62 and a key 63, the last named serving to maintain the circuit 61 open when signals or messages are not to be transmited. This circuit 61 also includes two primary coils 64 and 65 which are inductively coupled respectively to the secondary coils 44 and 55 of the circuits 37 and 47.

When the above described transmitting system is employed solely for telegraphic communication, either wireless or by wire, the circuit 61 is omitted and the tuning of the circuits 37 and 47 is such as to produce beats within audibility. Thus the circuit 37 may be tuned to a frequency of 30,000 per second and the circuit 47 tuned to a frequency of 29,000 per second, thereby giving a beat frequency of 1,000 per second which is within audibility. The telegraphic message is sent by use of either of the keys 18 or 41 or 51.

For receiving the waves or impulses emitted from the transmitting system of Fig. 1, one form of receiving system is shown in Fig. 2, comprising an open aerial circuit 70 having a primary inductance 71 and grounded at 72. This aerial circuit 70, 71 and 72 is inductively coupled through its primary coil 71 with a closed oscillatory circuit 73 including a secondary coil 74 and a variable condenser 75. This circuit 73 is tuned to the natural period of vibration of the aerial circuit 70, 71 and 72, here 1,000,000 per second, and is arranged to control a thermionic valve or detector 80.

This detector 80 is arranged to control a circuit 81 including a battery 82, two primary coils 83 and 84 and a tickler coil 85, the latter being located with respect to the secondary coil 74 to give the desired sensitiveness. The primary coils 83 and 84 are included in a closed oscillatory circuit 86 having a variable condenser 87 and being tuned to the aforesaid frequency of 1,000,000 per second.

For the purpose of selecting the desired secondary frequencies, the circuit 86 is inductively coupled through its primary coils 83 and 84 to two oscillatory circuits 90 and 91, the one including a secondary coil 92 and a variable condenser 93, and the other including a secondary coil 94 and a variable condenser 95. The oscillatory circuit 90 is tuned to the frequency of one of the incoming secondary frequencies, say 50,000 per second, and is arranged to control a thermionic valve or detor 100 which controls a circuit including a battery 101, a primary coil 102 and a tickler coil 103. The primary coil 102 is included in an oscillatory circuit 104 having a variable condenser 105, and being tuned to the secondary frequency of 50,000 per second. The oscillatory circuit 91 is tuned to the frequency of the other incoming secondary frequency of 35,000 per second, and is arranged to control a thermionic valve or detector 110, which controls a circuit including a battery 111, a primary coil 112 and a tickler coil 113. The primary coil 112 is included in an oscillatory circuit 114 having a variable condenser 115 and being tuned to the secondary frequency of 35,000 per second.

For causing the two series of selected periodic modifications to produce beats, the two oscillatory circuits 104 and 114 are inductively coupled to a common untuned circuit 116 including two secondary coils 117 and 118 arranged in operative relation respectively to the two primary coils 102 and 103. This circuit 116 is arranged to control a thermionic amplifier or detector 120 which is arranged to control a circuit 121 including a battery 122, a primary coil 123 and a tickler coil 124, this last coil 124 being coupled to a coil 125 in the circuit 116 in a manner to give the desired sensitive action. The primary coil 123 is included in an oscillatory circuit 126 tuned to the beat frequency 15,000 per second and including a variable condenser 127.

For amplifying the beat frequency of the circuit 126 the primary coil 123 is inductively coupled to a secondary 130 in a circuit 131 and including also an oscillatory circuit 132 having a variable condenser 133. The circut 131 is arranged to control an amplifier or detector 134 which controls the receiving circuit 135 comprising a battery 136, a suitable receiving instrument 137 and a tickler coil 138, this latter being suitably located with respect to the oscillating circuit 132 in order to give the required sensitive action.

In the foregoing the thermionic valves and oscillators 80, 100, 110, 120 and 134 have been identified generally and may be of any suitable type, but as here shown each, preferably, consists of an evacuated glass bulb 140 having sealed therein a plate electrode 141, a grid 142 and a filament 143, this latter element being in and heated by a local circuit 144 having a battery 145 and an adjustable resistance 146. In Fig. 3 the controlled circuit 121 includes the receiving instrument 137, and the connected amplifying circuits are dispensed with. This arrangement is employed where amplification of the received signals is unnecessary.

Having thus fully described my invention, I claim and desire to protect by Letters Patent:

1. The combination with means for emitting a series of waves, of means including two separate thermionic oscillator circuits for impressing on said waves a plurality of series of periodic modifications of different frequencies respectively, and means for impressing upon said waves and modifications a series of irregular modifications corresponding to a message.

2. The combination with means for emitting a series of waves, of means including two separate thermionic oscillator circuits for impressing on said waves a plurality of series of periodic modifications of different frequencies respectively, and means for impressing upon said waves and modifications a series of irregular modifications corresponding to sound waves to form a telephone message.

3. The combination with means for emitting a series of radiant impulses, of means including two separate thermionic oscillator circuits for impressing on said impulses a plurality of series of periodic modifications of different frequencies respectively, and means common to both of said circuits for impressing upon said impulses and modifications a series of irregular modifications corresponding to a message.

4. The combination with means for emitting a series of radiant impulses, of means including two separate thermionic oscillator circuits for impressing on said impulses a plurality of series of periodic modifications of different frequencies respectively, and means common to both of said circuits for impressing upon said impulses and modifications a series of irregular modifications corresponding to sound waves to form a telephone message.

5. The combination with means for emitting a series of waves, of means including two separate thermionic oscillator circuits for impressing on said waves simultaneously a plurality of series of periodic modifications of different frequencies respectively, and means actuated in response to sound waves for impressing upon said waves and modifications a series of irregular modifications corresponding to a message.

6. The combination with means for emitting a series of waves, of means including two separate thermionic oscillator circuits for impressing on said waves a plurality of series of periodic modifications of different frequencies respectively and a single signal transmitter for impressing upon said waves a series of irregular modifications corresponding to a message.

7. The combination with means for emitting a series of waves, of means including two separate thermionic oscillator circuits for impressing on said waves a plurality of series of periodic modifications of different frequencies respectively, and a telephone transmitter for impressing upon said waves a series of irregular modifications corresponding to sound waves to form a telephone message.

8. The combination with means for emitting a series of radiant impulses, of means including two separate thermionic oscillator circuits, for impressing on said impulses a plurality of series of periodic modifications of different frequencies respectively, and a signal transmitter common to both of said circuits for impressing upon said impulses and modifications a series of irregular modifications corresponding to a message.

9. The combination with means for emitting a series of radiant impulses, of means including two separate thermionic oscillator circuits for impressing on said impulses a plurality of series of periodic modifications of different frequencies respectively, and a telephone transmitter common to both of said circuits for impressing upon said impulses and modifications a series of irregular modifications corresponding to sound waves to form a telephone message.

10. A method of signalling, which consists in transmitting a series of waves having a given frequency modulated simultaneously with two secondary frequencies, modifying said waves from time to time to form signals, receiving said waves and producing therefrom two series of oscillations having frequencies corresponding to said secondary frequencies respectively, and causing said two series of oscillations to co-operate simultaneously in controlling a receiving device.

11. A method of signalling which consists in transmitting a series of radiant waves having a given frequency above audibility and having simultaneously impressed therein two series of modulations of different secondary frequencies respectively, each of said frequencies of said modulations being above audibility, and the difference between said two secondary frequencies being of a frequency substantially above the frequency of ordinary voice tones, simultaneously modifying both of said series of modulations by and in accordance with sound waves, receiving said radiant waves and producing therefrom two series of oscillations having frequencies corresponding respectively to the frequencies of said modulations and causing said two series of oscillations to cooperate simultaneously to reproduce said sound waves.

Signed at New York, in the county of New York and State of New York, this 22nd day of July, A. D. 1919.

JOHN HAYS HAMMOND, Jr.